US 6,622,683 B2

(12) United States Patent
Gracyalny et al.

(10) Patent No.: US 6,622,683 B2
(45) Date of Patent: Sep. 23, 2003

(54) ENGINE STARTING AND STOPPING DEVICE

(75) Inventors: Gary J. Gracyalny, Milwaukee, WI (US); Kevin Pok, West Bend, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 116 days.

(21) Appl. No.: 09/904,789

(22) Filed: Jul. 13, 2001

(65) Prior Publication Data

US 2001/0037785 A1 Nov. 8, 2001

Related U.S. Application Data

(60) Continuation-in-part of application No. 09/780,219, filed on Feb. 7, 2001, now Pat. No. 6,263,852, which is a division of application No. 09/183,425, filed on Oct. 30, 1998, now Pat. No. 6,230,678.

(51) Int. Cl.[7] .............................. F02N 5/02; F02N 1/00
(52) U.S. Cl. ................................ 123/185.14; 123/185.3
(58) Field of Search ........................ 123/185.14, 185.3, 123/185.2; 185/37, 39, 41 A; 56/11.3, 13.8, 11.8, 13.4; 192/224.1

(56) References Cited

U.S. PATENT DOCUMENTS

| 932,735 A | 8/1909 | Willard |
| 950,848 A | 3/1910 | Gardner |
| 1,009,503 A | 11/1911 | Goodhart |
| 1,022,087 A | 4/1912 | Jenney |
| 1,097,899 A | 5/1914 | Volkmar |
| 1,099,685 A | 6/1914 | Bennett |
| 1,137,358 A | 4/1915 | Sinclair |
| 1,394,619 A | 10/1921 | Hanson |
| 1,936,554 A | 11/1933 | Lansing |
| 2,293,322 A | 8/1942 | Veach |
| 2,734,327 A * | 2/1956 | Whitney ............... 56/13.8 |

(List continued on next page.)

FOREIGN PATENT DOCUMENTS

| FR | 2516601 | 5/1983 |
| FR | 2639677 | 6/1990 |
| GB | 676850 | 6/1952 |
| JP | 62-53703 | 3/1983 |
| JP | 58051271 | 3/1983 |
| WO | WO 98/57062 | 12/1998 |
| WO | WO 00/26531 | 5/2000 |

OTHER PUBLICATIONS

16 CFR Sec. 1205.1–1205.36, see specifically 16 CFR 1205 (a) and (c), published prior to Oct. 30, 1997 by the Office of the Federal Register National Archives and Records Administration, United States of America.

Primary Examiner—Mahmoud Gimie
(74) Attorney, Agent, or Firm—Michael Best & Friedrich LLP

(57) ABSTRACT

An engine starting device includes a first pulley mounted to the crankshaft of an engine for rotation with the crankshaft. A second pulley is mounted to an arbor that extends into a spring housing containing an elastic member. The elastic member is interconnected with the arbor such that rotation of the arbor in a loading direction loads the elastic member. A belt interconnects the two pulleys and a tensioner is mounted near the belt to selectively apply tension to the belt. When the tensioner applies sufficient tension to the belt, the second pulley rotates in response to the first pulley and crankshaft rotating. Rotation of the second pulley causes the elastic member to become loaded in response to rotation of the arbor in the loading direction. A ratchet wheel and pawl may be used to keep the arbor from rotating in the unloading direction. To initiate start up of the engine, the pawl is removed from engagement with the ratchet wheel. A starter pinion rotates on a helical gear as the elastic member is unloaded. The starter pinion engages the flywheel and causes the flywheel to rotate in the starting direction.

14 Claims, 7 Drawing Sheets

U.S. PATENT DOCUMENTS

| | | |
|---|---|---|
| 2,922,411 A | 1/1960 | Skinner |
| 2,999,489 A | 9/1961 | Coughlin et al. |
| 3,005,449 A | 10/1961 | Wood, Jr. et al. |
| 3,013,372 A * | 12/1961 | Basham ................... 56/11.8 |
| 3,084,679 A | 4/1963 | Brown et al. |
| 3,125,997 A | 3/1964 | Corley |
| 3,139,877 A | 7/1964 | Graybill |
| 3,151,605 A | 10/1964 | Tillotson et al. |
| 3,165,100 A | 1/1965 | Svendsen |
| 3,216,528 A | 11/1965 | Lohr |
| 3,290,871 A | 12/1966 | Haas |
| 3,301,243 A | 1/1967 | Lyvers |
| 3,324,842 A | 6/1967 | Haas |
| 3,367,459 A * | 2/1968 | Rubin .................. 192/224.1 |
| 3,375,814 A | 4/1968 | Hamman |
| 3,395,687 A | 8/1968 | Harkness |
| 3,447,523 A | 6/1969 | Bradbury et al. |
| 3,543,892 A * | 12/1970 | Ballie .................. 192/224.1 |
| 3,692,010 A | 9/1972 | Dooley et al. |
| 3,853,109 A | 12/1974 | Dooley |
| 3,960,246 A | 6/1976 | Fisher |
| 4,048,787 A * | 9/1977 | Harkness et al. ............ 56/11.3 |
| 4,067,243 A | 1/1978 | Kurata et al. |
| 4,104,927 A | 8/1978 | Jensen et al. |
| 4,176,648 A | 12/1979 | Gotch et al. |
| 4,230,084 A | 10/1980 | Gotch et al. |
| 4,363,298 A | 12/1982 | Kuhn |
| 4,441,466 A | 4/1984 | Tangorra |
| 5,086,890 A | 2/1992 | Turczyn et al. |
| 5,186,134 A | 2/1993 | Morishima et al. |
| 5,431,135 A | 7/1995 | Tyler |
| 5,435,118 A * | 7/1995 | Cobile ................... 56/13.4 |
| 5,537,966 A | 7/1996 | Ohnishi |
| 5,596,902 A | 1/1997 | McMillen |
| 5,970,940 A | 10/1999 | Penton |
| 6,230,678 B1 | 5/2001 | Gracyalny et al. |

\* cited by examiner

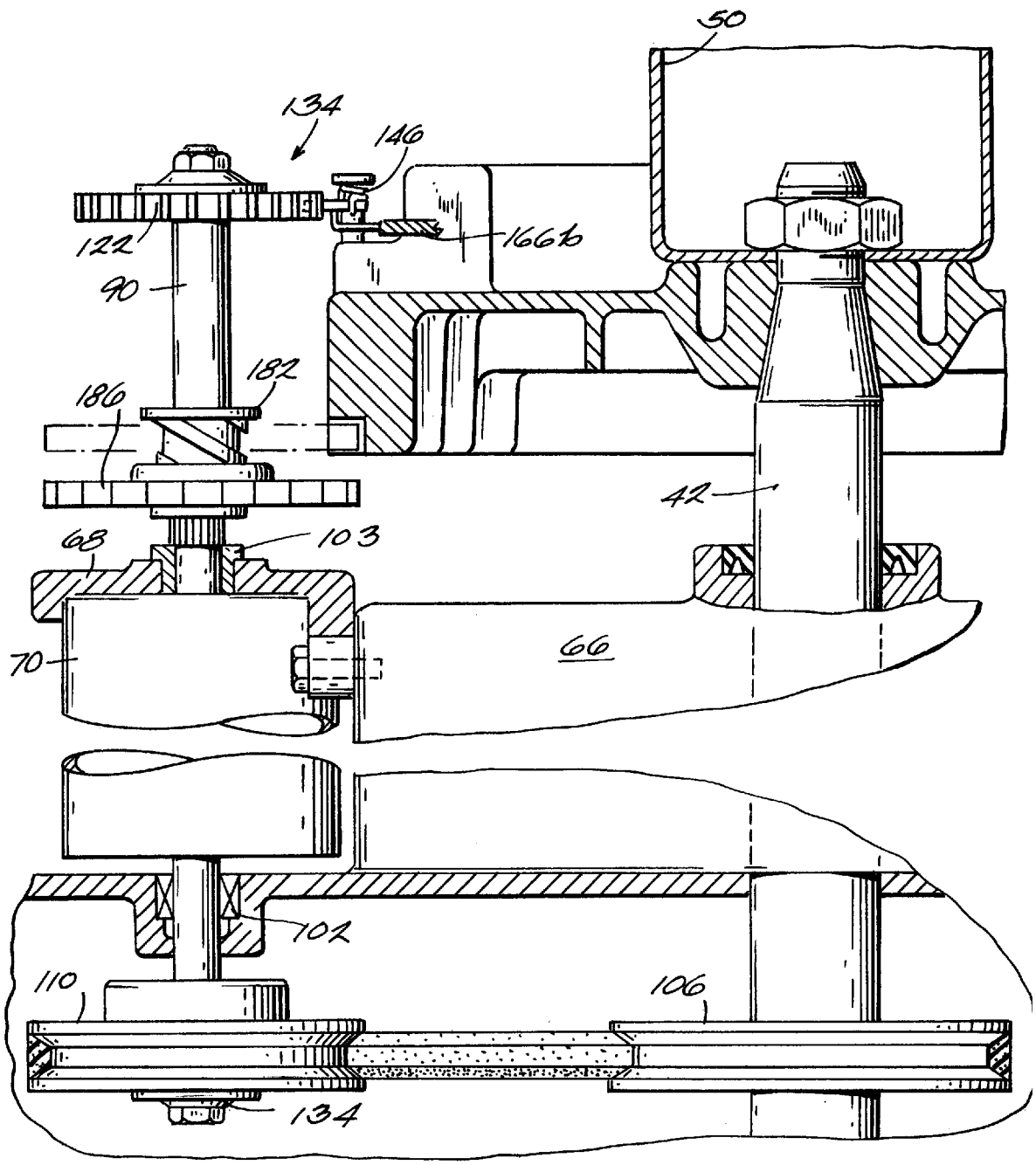

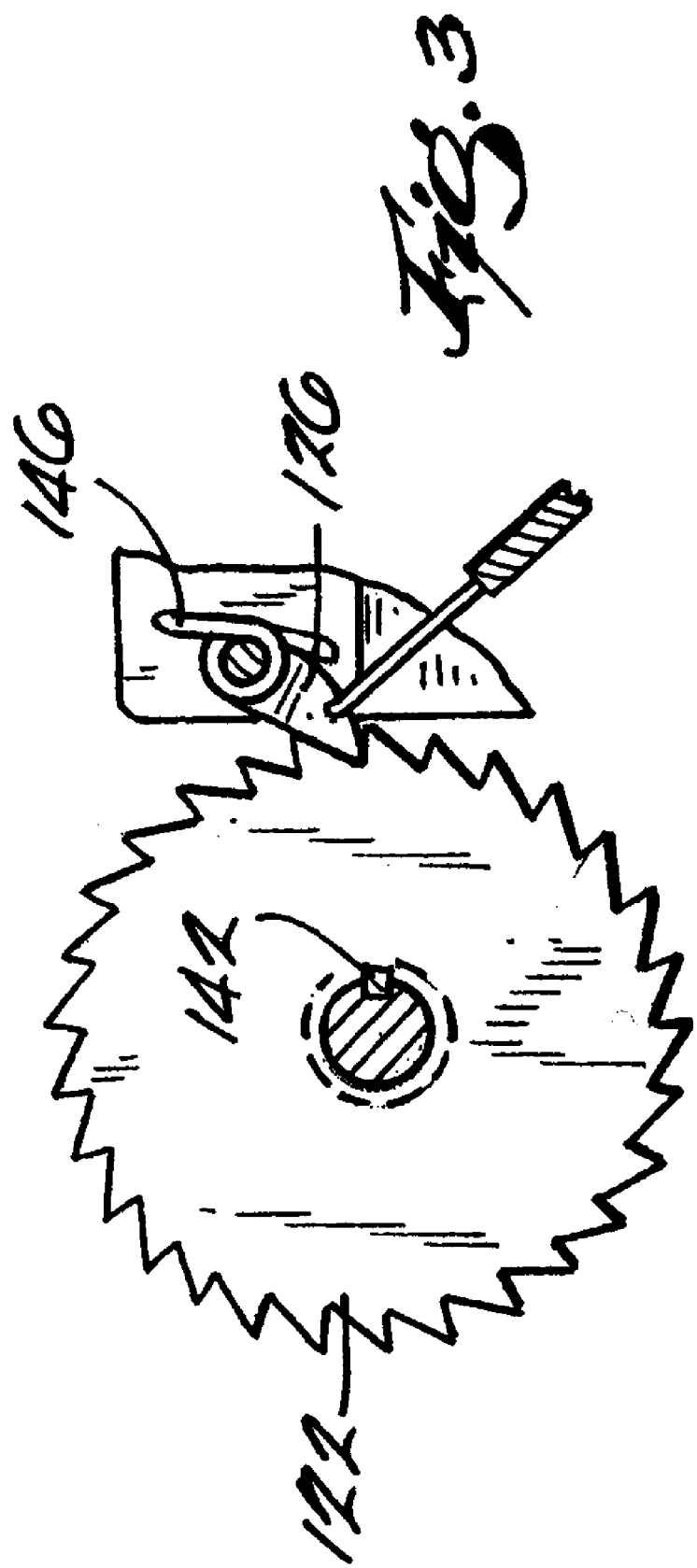

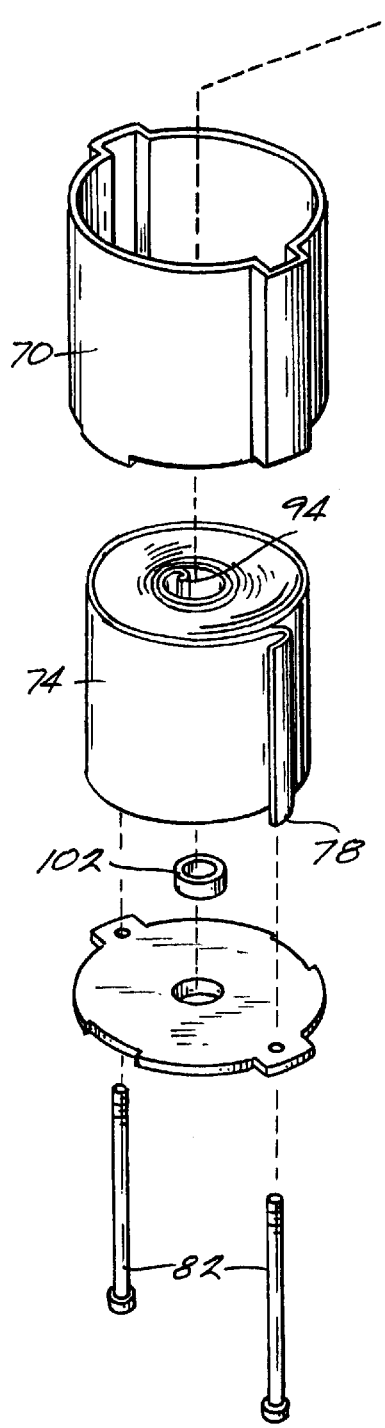
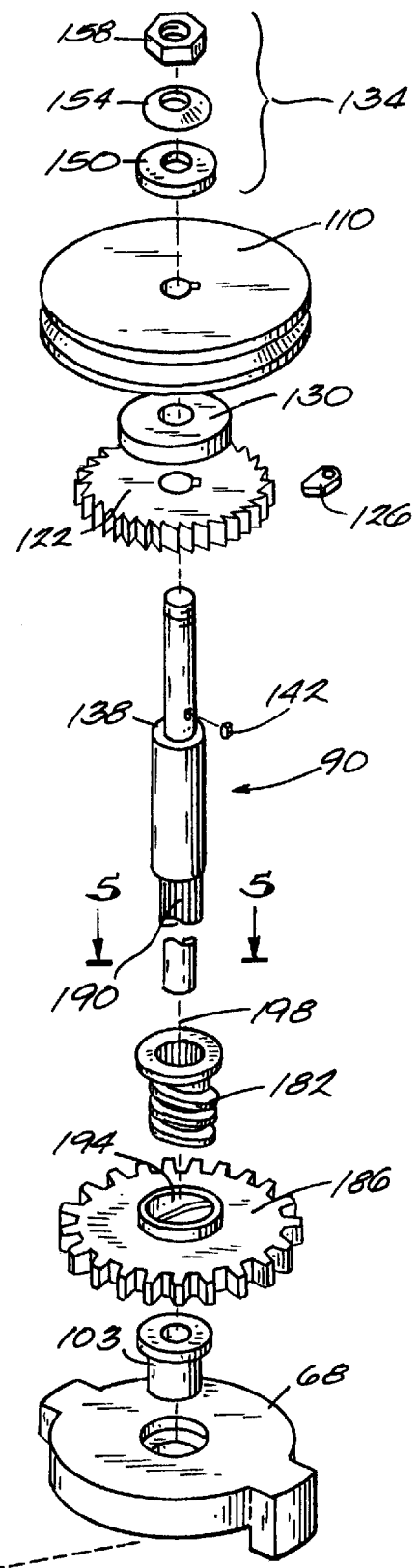
Fig. 4

ENGINE STARTING AND STOPPING DEVICE

This application is a continuation-in-part of U.S. application Ser. No. 09/780,219 filed Feb. 9, 2001, now U.S. Pat. No. 6,263,852, which is a divisional of U.S. application Ser. No. 09/183,425 filed Oct. 30, 1998, now U.S. Pat. No. 6,230,678, the entire contents of both applications being incorporated herein by reference.

BACKGROUND

The invention relates to a starting and stopping device for an internal combustion engine. More specifically, the present invention relates to a mechanism for starting the engine by unloading stored power in an elastic member.

SUMMARY

The present invention provides an internal combustion engine including a spring loading mechanism, an engine starting mechanism, and an energy storing mechanism. The energy storing mechanism is mounted to the engine and includes at least one elastic member (e.g., a spring). An arbor is interconnected with the elastic member and rotates in a loading direction to load the elastic member, and in an unloading direction in response to unloading of the elastic member.

The spring loading mechanism includes a first pulley coupled to the engine's crankshaft for rotation therewith, a second pulley coupled to the arbor for rotation therewith, a belt coupling the first and second pulleys, and a tensioner actuable to apply tension to the belt and to cause the second pulley to rotate in response to rotation of the first pulley. The tensioner is preferably biased to apply tension to the belt. The elastic member is loaded in response to rotation of the crankshaft in a starting direction as such rotation is transmitted through the first pulley, belt, and second pulley to cause the arbor to rotate in the loading direction and load the elastic member.

The engine starting mechanism includes a helically threaded member interconnected with the arbor, and a starter pinion threaded onto the helically threaded member. Rotation of the arbor in the unloading direction causes the starter pinion to move along the helically threaded member and into engagement with the engine's flywheel. The starter pinion converts rotation of the arbor in the unloading direction into rotation of the flywheel in the starting direction to start the engine. The starter pinion may be a friction roller or a toothed gear.

The invention also includes a control system for releasing the spring from a loaded state to cause rotation of the arbor in the unloading direction. The control system may include one or more manual actuators, such as a bail handle and/or a push button interconnected with the tensioner and a locking mechanism. The locking mechanism may include a ratchet wheel and pawl assembly used to selectively prevent the elastic member from unloading. When actuated, the manual actuator moves the tensioner away from the belt to reduce tension in the belt, and also releases the locking mechanism to initiate unloading of the elastic member. When released, the manual actuator permits the tensioner to apply tension to the belt and permits the pawl to engage the ratchet wheel.

Other features and advantages of the invention will become apparent to those skilled in the art upon review of the following detailed description, claims, and drawings.

BRIEF DESCRIPTION OF THE DRAWINGS

FIG. 2b is a cross-section view of a portion of the lawnmower illustrated in FIG. 1, illustrating a spring loading mechanism an engine starting mechanism and first and second pulleys in an alternative position to that shown in FIGS. 2 and 2a.

FIG. 3 is a view of the ratchet wheel and pawl, taken along line 3—3 in FIG. 2.

FIG. 4 is an exploded view of the spring housing assembly.

Figure 1:
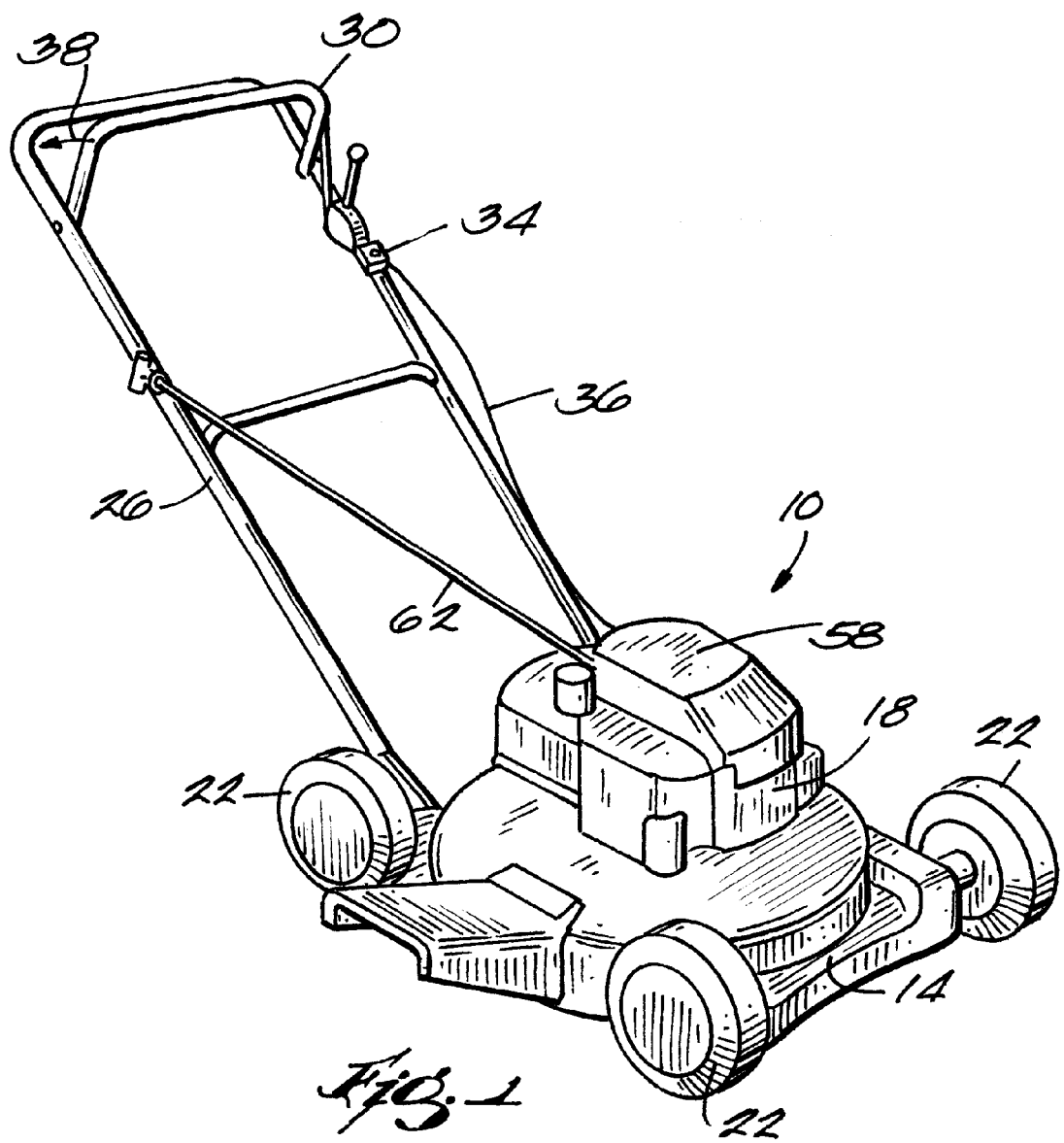
FIG. 1 is a perspective view of a lawnmower embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a lawnmower 10 comprising a deck 14, a stationary housing 18 mounted to the deck 14, an engine 20 (FIG. 2) mounted to the deck 14 generally under the stationary housing 18, a set of wheels 22 supporting the deck 14 above the ground, and a handle assembly 26 extending up from the deck 14. The lawnmower 10 also includes first and second manual actuators, which are a bail handle 30 and push button 34 in the illustrated embodiment, supported on the handle 26 at a location remote from the engine 20. The bail handle 30, or alternatively the push button 34, is operatively interconnected with mechanisms in the engine 20 by way of a cable 36. As will be described below in more detail, the bail handle 30 and push button 34 must both be actuated in order to start up the engine 20.

It should be noted that although the invention is illustrated as embodied in a lawnmower 10, the invention may be embodied in other devices powered by either a four-stroke or two-stroke cycle internal combustion engine. In such other devices, it may be that only a single manual actuator, such as the push button 34 or bail handle 30, is actuated to start the engine 20.

During operation of the lawnmower 10, the bail handle 30 must be moved to a start position (i.e., as shown at 38 in FIG. 1) near the end of the handle assembly 26 to keep the engine 20 operating. The bail handle 30 is biased to move to a rest position (see FIG. 1) once let go by the operator. This causes the ignition circuit of the engine 20 to be grounded and shutdown of the engine 20 to be initiated. In order to move the bail handle 30 to the start position, the push button 34 must first be depressed and held while the bail handle 30 is moved. Depressing the push button 34 disengages a lock on the bail handle 30 or on another movable member in the engine starting mechanism (discussed in further detail below) that is required to start the engine 20. Alternatively, the bail handle 30 and push button 34 may be configured such that the bail handle 30 must first be moved to enable the push button 34 to be actuated, in which case actuation of the push button 34 starts the engine 20.

Figure 2:
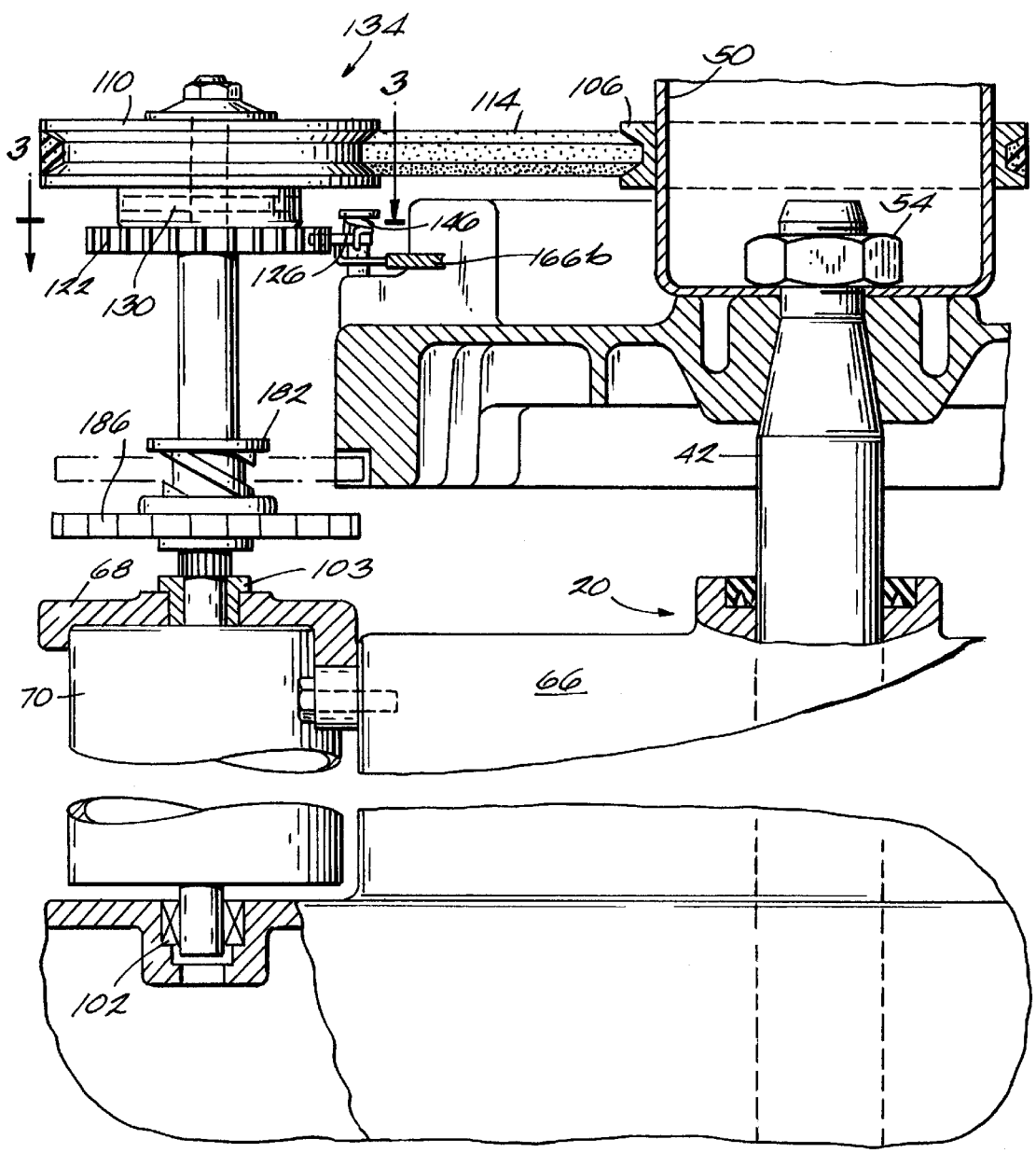
FIG. 2 is a cross-section view of a portion of the lawnmower illustrated in FIG. 1, illustrating a spring loading mechanism and an engine starting mechanism.

Turning now to FIG. 2, the engine 20 includes a crankshaft 42 that rotates in a known manner to drive a cutting blade positioned under the deck 14 of the lawnmower 10. The crankshaft 42 may be vertically oriented as in the illustrated embodiment such that the cutting blade is attached directly to the lower end of the crankshaft 42. Mounted to the top end of the crankshaft 42 are a flywheel 46 and a starter cup 50. A nut 54 may be threaded onto the end of the crankshaft to secure the starter cup 50 and flywheel 46 to the top end of the crankshaft 42, as illustrated.

A conventional recoil starter assembly 58 (FIG. 1) is rotatably mounted to the stationary housing 18 above the flywheel 46, crankshaft 42, and starter cup 50. The recoil starter 58 includes dogs that engage the starter cup 50 to rotate the crankshaft 42 when a starter rope 62 (FIG. 1) is pulled. The engine 20 may be started in a conventional manner by pulling on the starter rope 62.

Mounted on the side of the engine 20 (e.g., to an engine housing 66 or crankcase) is a mounting bracket 68. A spring housing 70 is fixed with respect to the mounting bracket 68 and the engine housing 66 to prevent relative movement between the spring housing 70 and engine housing 66. As seen in FIG. 4, an elastic member or spring 74, such as a coil of spring steel, is housed within the spring housing 70. The outer end 78 of the spring 74 is attached to the spring housing 70 with a bolt 82, and the inner end 86 (FIG. 5) of the spring 74 is releasably attached to an arbor 90 by way of a hook 94 (described by the inner end 86 of the spring 74) and an eyelet 98 (formed in the side of the arbor 90). The arbor 90 is supported for rotation with bearings 102 and 103, and rotates with respect to the spring housing 70.

FIGS. 2 through 6 illustrate a spring loading mechanism which includes a first pulley 106 mounted on the starter cup 50, a second pulley 110 mounted to one end of the arbor 90, a belt 114 coupling the pulleys 106, 110, a tensioner 118 mounted proximate the belt 114, a ratchet wheel 122, a pawl 126, a spacer 130, and an overwind clutch 134.

Figure 2A:
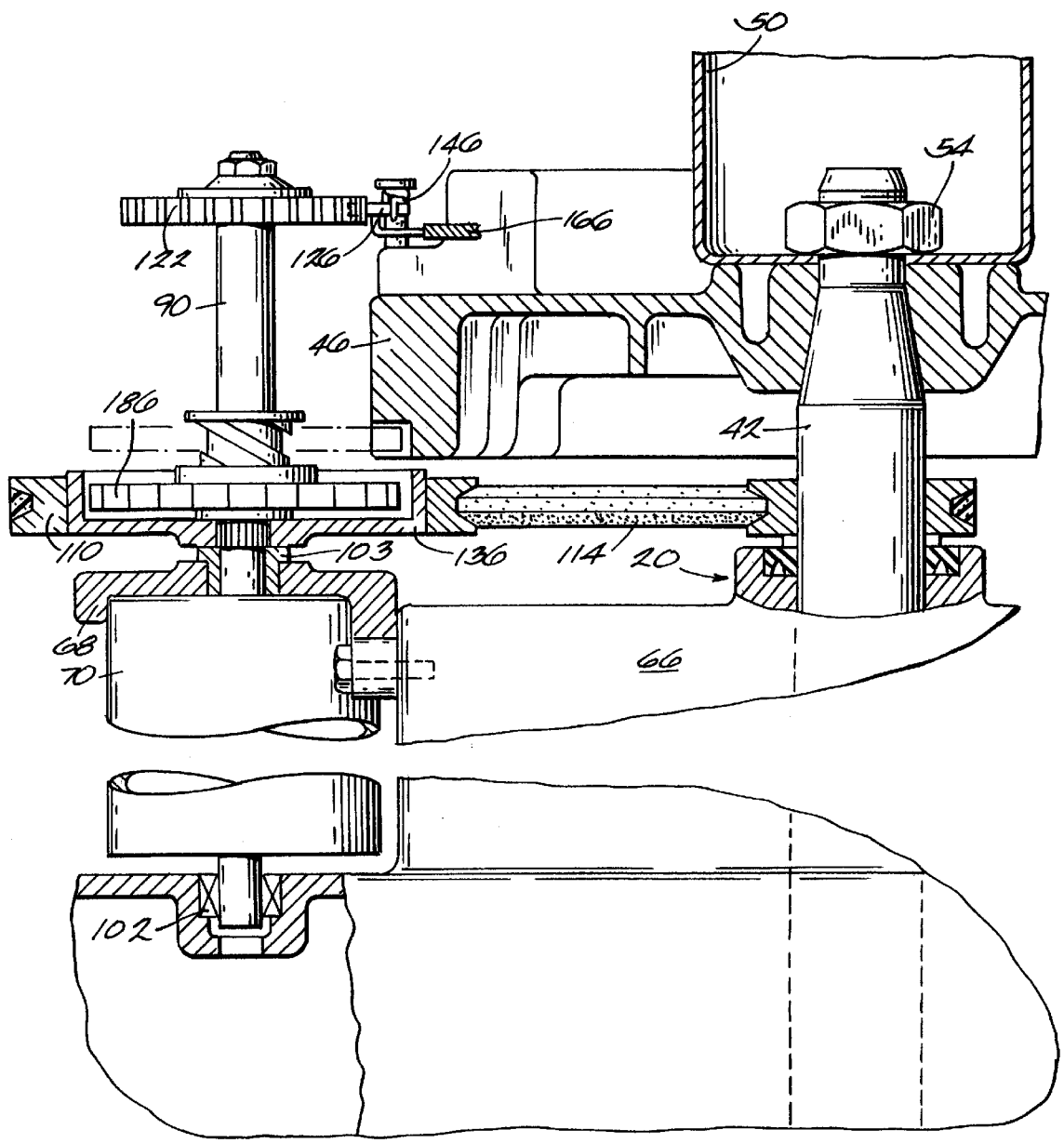
FIG. 2a is a cross-section view of a portion of the lawnmower illustrated in FIG. 1, illustrating a spring loading mechanism, an engine starting mechanism and first and second pulleys in an alternative position to that shown in FIG. 2.

Two alternative arrangements are illustrated in FIGS. 2a and 2b in which the pulleys 106, 110 are mounted below the flywheel 46 and above or below the spring housing 70 respectively. In one of the alternative arrangements (the one with the second pulley 110 mounted to the arbor 90 above the spring housing 70 and shown in FIG. 2a), a cup 136 is rotationally fixed to the arbor 90 with splines, and the second pulley 110 is fixed to the cup 136. It should be noted that although the illustrated first and second pulleys 106, 110 have substantially identical diameters, the first pulley 106 may be made with a smaller diameter (as shown in FIG. 2a for the pulley 106 mounted below the flywheel 46 and above the spring housing 70), such that more than one rotation of the crankshaft 42 is required for each rotation of the arbor 90.

The arbor 90 includes a shoulder 138 on which the ratchet wheel 122 is positioned. The ratchet wheel 122 is keyed at 142 (FIGS. 3 and 4) to the arbor 90 as illustrated or is otherwise fixed for rotation with the arbor 90 (e.g., by way of splines on the arbor 90). The pawl 126 is mounted to the engine housing 66 proximate the ratchet wheel 122, and is biased by a torsional spring 146 (FIGS. 2 and 3) into engagement with the ratchet wheel 122.

The spacer 130 sits on top of the ratchet wheel 122, and the second pulley 110 sits on top of the spacer 130. As seen in FIG. 4, the overwind clutch 134 includes a flat washer 150, a Belleville washer 154, and a nut 158 threaded onto the end of the arbor 90. As the nut 158 is tightened down, the Belleville washer 154, flat washer 150, second pulley 110, spacer 130, and ratchet wheel 122 are sandwiched between the nut 158 and the shoulder 138 of the arbor 90. The Belleville washer 154 deflects and creates a friction coupling between the second pulley 110 and the arbor 90.

The operation of the spring loading mechanism will now be described. The spring loading mechanism is preferably actuated during engine coastdown, but may alternatively be actuated during operation of the engine 20. During ordinary operation of the engine 20, the crankshaft 42 and flywheel 46 rotate in a starting or operating direction 162 (FIG. 6), which is clockwise in the illustrated embodiment. This in turn causes the first pulley 106 to rotate in the starting direction 162.

Figure 6:
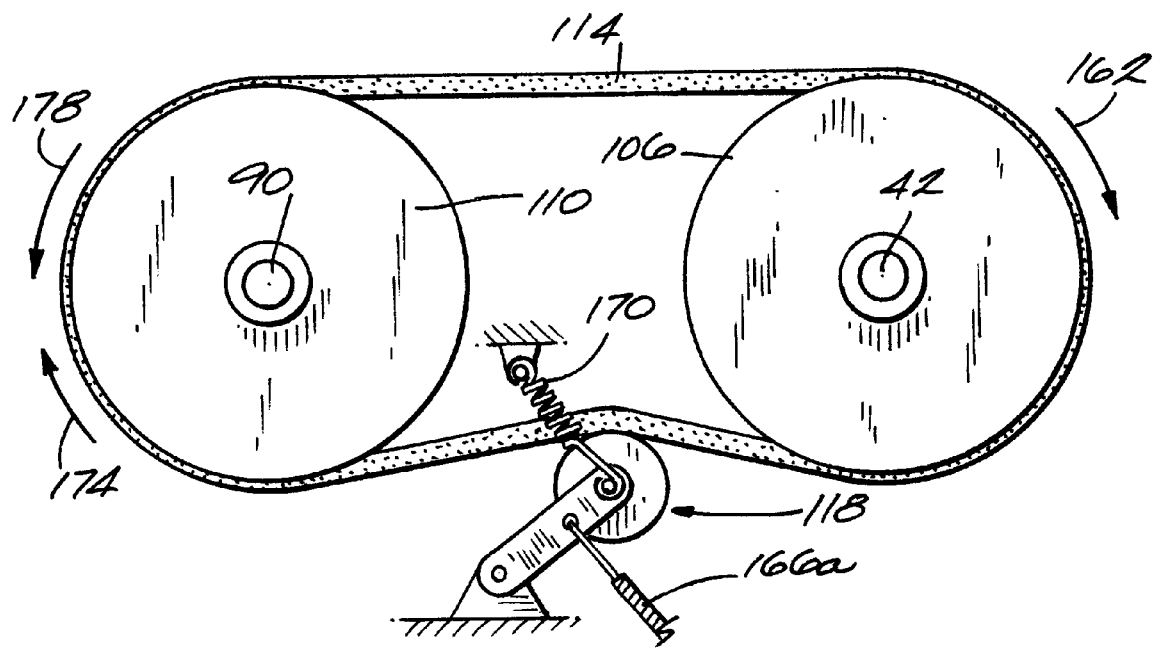
FIG. 6 is a top schematic illustration of the pulleys, belt, and tensioner assembly.

As seen in FIG. 6, the tensioner 118 is actuated by way of a cable 166a or other linkage interconnected with the cable 36. When the bail handle 30 is held in the starting position, the tensioner 118 is pulled away from the belt 114, but when the bail handle 30 is released (i.e., to initiate engine shutdown and coastdown of the flywheel 46 and crankshaft 42), a biasing member such as the illustrated return spring 170 causes the tensioner 118 to take up the slack in the belt 114. The tensioner 118 applies tension on the slack side of the belt 114, thereby coupling the second pulley 110 to the first pulley 106 and causing rotation of the second pulley 110 in a loading direction 174. The loading direction 174 is the same as the starting direction 162 (i.e., clockwise) in the illustrated embodiment. The arbor 90 and ratchet wheel 122 rotate in the loading direction 174 with the second pulley 110 due to the frictional engagement of the overwind clutch 134 discussed above.

Figure 5:
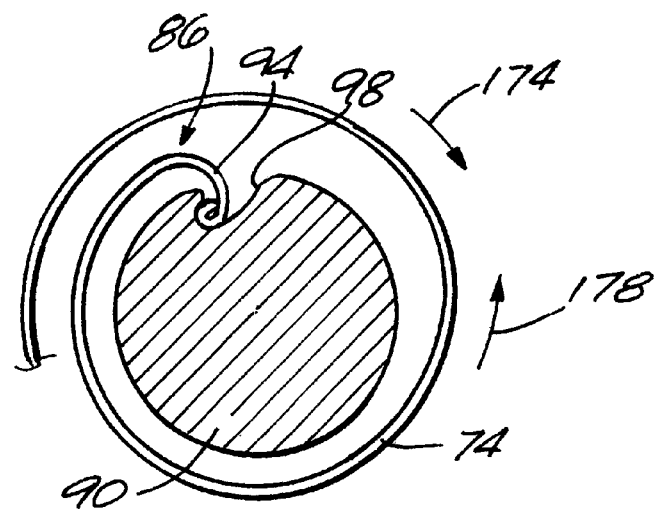
FIG. 5 is a cross-section view of the arbor and spring interconnection, taken along line 5—5 in FIG. 4.

With reference to FIGS. 3 and 5, the hook 94 and eyelet 98 interconnection between the arbor 90 and spring 74 causes the spring 74 to be loaded in response to rotation of the arbor 90 in the loading direction 174. As the spring 74 is loaded, the pawl 126 and ratchet wheel 122 prevent the arbor 90 from rotating opposite the loading direction 174, in an unloading direction 178. In this regard, the ratchet wheel 122 and pawl 126 may be termed a locking mechanism.

As the spring 74 is loaded, it creates increasing resistance to further rotation of the crankshaft 42 and flywheel 46 in the starting or operating direction 162. If the spring 74 is loaded during engine coastdown, the spring 74 has a braking effect on the crankshaft 42 and flywheel 46. If the spring 74 is loaded during engine operation, the driving force of the 4-stroke or 2-stroke combustion cycle is sufficient to load the spring 74 without substantially limiting the operation of the engine 20.

Regardless of whether the spring 74 is loaded during engine coastdown or engine operation, the overwind clutch 134 permits the flywheel 46 and crankshaft 42 to be uncoupled from the spring 74 once the spring 74 has reached a predetermined load or torsional threshold. More specifically, the frictional forces provided by the overwind clutch 134 that couple the second pulley 110 to the arbor 90 are overcome once the predetermined load or torsional threshold is reached in the spring 74. Once the spring 74 reaches this predetermined load, the second pulley 110 slips and rotates with respect to the arbor 90 without further loading the spring 74.

The overwind clutch 134 is therefore a means for reducing the incidence of damage to the spring 74 due to overwinding. In this regard, the overwind clutch 134 can be mounted anywhere provided it is operatively positioned between the crankshaft 42 and the spring 74. That is to say that the overwind clutch 134 must be able to uncouple the crankshaft 42 from the spring 74 so that loading of the spring 74 is stopped at the desired threshold even if the crankshaft 42 is still rotating.

Although the above-described spring loading system contemplates loading the spring 74 during engine coastdown, the tensioner 118 may be actuated manually or automatically to load the spring 74 during normal operation of the engine 20.

FIGS. 2 and 4 illustrate the spring unloading or engine starting mechanism that causes startup of the engine 20. The unloading mechanism includes a helically threaded member 182 and a starter pinion 186. The helically threaded member 182 is fixed (e.g., with a key or splines 190) for rotation with the arbor 90. The starter pinion 186 includes a hub 194 that is threaded onto the helically threaded member 182.

The spring 74 is unloaded in response to the pawl 126 being pulled away from the ratchet wheel 122. The pawl 126 may be so actuated by way of a cable or other linkage 166b interconnecting the pawl 126 and the cable 36 such that moving the bail handle 30 to the start position pivots the pawl 126 away from the ratchet wheel 122. Moving the bail handle 30 to the start position may therefore substantially simultaneously pivot the pawl 126 and tensioner 118 away from the ratchet wheel 122 and belt 114, respectively. It should be noted that in other embodiments the push button 34 or another manual actuator can be used to actuate the tensioner 118 and pawl 126.

When the tensioner 118 is disengaged from the belt 114, the first and second pulleys 106, 110 are substantially uncoupled. As used herein, "substantially uncoupled" means that rotation of the arbor 90 and second pulley 110 in the unloading direction 178 is not transmitted to the crankshaft 42 through the belt 114 to any substantial degree that would interfere with engine startup (which is described below). Also, during engine operation, when the pulleys 106, 110 are substantially uncoupled, the first pulley 106 may rotate in response to rotation of the crankshaft 42, but frictional forces between the belt 114 and the pulleys 106, 110 are insufficient to cause substantial rotation of the second pulley 110 or any significant loading of the spring 74.

As the spring 74 unloads, the arbor 90 is rotated in the unloading direction 178 (FIG. 5), which causes the starter pinion 186 to climb up the helically threaded member 182 along the axis of rotation 198 of the arbor 90. As the starter pinion 186 approaches or reaches the top of the helically threaded member 182, the teeth of the starter pinion 186 mesh with teeth formed integrally with the flywheel 46. Rotation of the starter pinion 186 in the unloading direction 178 causes the flywheel 46 to rotate in the starting direction 162, thereby causing startup of the engine 20.

Once the engine 20 is started, the flywheel 46 overruns the starter pinion 186 and causes the starter pinion 186 to rotate back down the helically threaded member 182. It should be noted that the gear teeth associated with the flywheel 46 may be provided by a ring gear mounted to the flywheel 46 as an alternative to being integrally formed with the flywheel 46. In alternative embodiments the starter pinion 186 may take the form of a friction roller that engages the flywheel 46 by way of frictional forces.

Turning again to FIG. 5, once the spring 74 is substantially unloaded, the inner end 86 slides or slips out of the eyelet 98 in the arbor 90 to reduce the likelihood of the spring 74 being damaged by bending back on itself at the inner end 86.

What is claimed is:

1. An internal combustion engine comprising:
an engine housing;
a crankshaft mounted for rotation within said engine housing;
a flywheel mounted to said crankshaft for rotation therewith in a starting direction during startup and operation of said engine;
a spring housing mounted to said engine housing such that there is substantially no relative rotation between said engine housing and said spring housing;
an energy storing mechanism including at least one elastic member housed within said spring housing, said elastic member having a portion fixed to said spring housing;
an arbor extending into said spring housing and interconnected with a portion of said elastic member such that rotation of said arbor in a loading direction causes said elastic member to become loaded, said arbor rotating in an unloading direction in response to unloading of said elastic member;
a spring loading mechanism including a first pulley coupled to said crankshaft for rotation therewith, a second pulley coupled to said arbor for rotation therewith, a belt coupling said first and second pulleys, and a tensioner actuable to apply tension to said belt and to cause said second pulley to rotate in response to rotation of said first pulley, wherein rotation of said crankshaft in said starting direction rotates said first pulley, which rotation is transmitted through said belt to said second pulley to rotate said arbor in said loading direction to thereby load said elastic member; and
a starting mechanism selectively initiating unloading of said elastic member to cause engine startup.

2. The engine of claim 1, wherein said starting mechanism includes a starter pinion rotating in response to rotation of said arbor and selectively engageable with said flywheel to convert rotation of said arbor in said unloading direction into rotation of said flywheel in said starting direction to start said engine.

3. The engine of claim 2, wherein said starting mechanism further includes a helically threaded member interconnected with said arbor and rotatable about an axis of rotation, wherein said starter pinion is threaded onto said helically threaded member, and wherein rotation of said arbor in said unloading direction causes said helically threaded member to rotate about said axis of rotation to cause said starter pinion to move axially along said helically threaded member and into engagement with said flywheel.

4. The engine of claim 3, wherein said helically threaded member is mounted directly onto said arbor, and wherein said axis of rotation of said helically threaded member is substantially collinear with an axis of rotation of said arbor.

5. The engine of claim 2, wherein said starter pinion includes a friction roller selectively engaging a friction surface of said flywheel.

6. The engine of claim 2, wherein said flywheel has gear teeth interconnected therewith, and wherein said starter pinion includes gear teeth selectively meshing with said flywheel gear teeth.

7. The engine of claim 1, further comprising a control system for releasing said elastic member from a loaded state to cause rotation of said arbor in said unloading direction.

8. The engine of claim 7, wherein said control system includes at least one manual actuator remotely located with respect to said engine and actuable to release said elastic member from said loaded state.

9. The engine of claim 7, wherein said tensioner is biased toward said belt to apply tension to said belt, said tensioner being movable away from said belt in response to actuation of said control mechanism such that said first and second pulleys are substantially uncoupled.

10. The engine of claim 1, further comprising an overwind clutch operatively positioned between said crankshaft and said elastic member and permitting rotation of said crankshaft without further loading of said elastic member in the event the load on said elastic member exceeds a predetermined value.

11. The engine of claim 10, wherein said overwind clutch is mounted to said arbor and rotationally couples said second pulley and said arbor.

12. The engine of claim 1, further comprising a locking mechanism for preventing said elastic member from unloading during loading of said elastic member.

13. The engine of claim 12, wherein said locking mechanism includes a ratchet wheel mounted to said arbor, and a pawl mounted to said engine housing.

14. The engine of claim 1, wherein said elastic member and said arbor are releasably coupled by way of a hook on said elastic member releasably engaging an eyelet on said arbor in response to said elastic member becoming substantially unloaded.

* * * * *